United States Patent [19]

Wissell

[11] Patent Number: 5,550,729

[45] Date of Patent: Aug. 27, 1996

[54] POWER SEQUENCING CONTROL

[75] Inventor: Daniel Wissell, Acton, Mass.

[73] Assignee: Digital Equipment Corporation, Maynard, Mass.

[21] Appl. No.: 257,757

[22] Filed: Jun. 9, 1994

[51] Int. Cl.⁶ .................................................. H02M 7/00
[52] U.S. Cl. ............................ 363/65; 363/50; 327/321; 307/75
[58] Field of Search ........................... 363/65, 71, 72, 363/80, 50; 323/266, 268, 269, 270, 272, 225; 307/75, 76, 33, 36, 78, 16; 327/321

[56] References Cited

U.S. PATENT DOCUMENTS

| | | | |
|---|---|---|---|
| 3,984,799 | 10/1976 | Fletcher et al. | 321/2 |
| 4,150,425 | 4/1979 | Nagano et al. | 363/56 |
| 4,290,101 | 9/1987 | Hergenhan | 363/65 |
| 4,868,480 | 9/1989 | van der Linde | 307/10.1 |
| 5,472,308 | 5/1995 | Brown | 323/267 |

*Primary Examiner*—Peter S. Wong
*Assistant Examiner*—Shawn Riley
*Attorney, Agent, or Firm*—Denis G. Maloney; Arthur W. Fisher

[57] ABSTRACT

An apparatus for sequencing turn-on and turn-off of power converters includes a first DC to DC converter responsive to a control signal for asserting a voltage supply signal and a sense circuit responsive to the output of said first converter to sense the level of voltage at the output of the first converter and to provide an enable signal in response to the output of said first converter when the first converter reaches a desired value. The apparatus further includes a second DC to DC converter responsive to said enable signal to provide a second supply voltage at a second different voltage level. The sequencing control has a circuit responsive to said second supply voltage and the first supply voltage, to short the second DC to DC converter to a reference potential.

5 Claims, 8 Drawing Sheets

POWER SEQUENCING CONTROL

BACKGROUND OF THE INVENTION

This invention relates generally to computer systems and more particularly to power systems used in computers.

As is known in the art, computer systems have become ubiquitous. Computer systems generally include a central processing unit, memory and I/O devices all of which are packaged together typically on a plurality of printed circuit boards which are disposed within a common computer system cabinet. In order to function, these circuit boards are provided with D.C. power from a D.C. supply, and the D.C. power is distributed to the electrical circuits on the printed circuit board.

One of the principal considerations which drive improvements to computer system hardware is to increase the speed of the computer system hardware. Speeds are increased using various techniques including scaling of standard semiconductor processing techniques to provide scaled semiconductor devices, that is devices having smaller geometries i.e. dimensions. In particular, one type of scaling arrangement used for computer devices requires that the power supply voltages fed to the devices be reduced in magnitude from the voltage provided to unscaled devices in order to increase the reliability of the devices. Scaling of logic devices has led to the need for multiple power supplies in high performance computer systems. Other system requirements have also led to the need for multiple power supplies.

Several techniques are known for providing power to computer system devices. In prior techniques, a large power supply which converted illustratively 117 A.C. volts into 5 volts or other D.C. voltages was provided in the cabinet of the computer system. The voltages were then distributed via a power bus to each of the modules in the computer system. Newer techniques referred to as "distributed power techniques" use a D.C. power supply supplied via an appropriate line voltage. This DC supply is at a relatively high DC voltage illustratively 48 volts. This high voltage, however, is at a relatively low current level and is distributed to each printed circuit board in the computer system. On each printed circuit board is at least one DC to DC converter which locally converts the input high level DC voltage to at least one low level DC voltage for use by the electric circuit devices on the module.

A problem arises when modules and systems contain both scaled or low voltage circuits and standard higher voltage circuits. For example, many modern computer systems are fabricated with logic devices which require both 5.0 volt and 3.3 volt supplies to feed the logic devices within the system. In certain types of semiconductor processing it is an artifact of the processing that for the 3.3 volt supply logic devices an input signal to the device from the 5 volt supply logic can destroy the 3.3 volt logic devices unless the 3.3 supply voltage is present at the power input of the 3.3 logic device prior to application of the input signal.

This problem leads to the necessity of designing a power sequencer for a power system which controls timing of operation of the power converters during turn on of the system. Accordingly, in order to prevent damage to the logic devices, it is necessary to bring the DC to DC converters to operating voltages in a controlled and known sequence.

A further problem may arise in retrofit designs or where a newer design is to use existing components of a previous design and where the provision for only one enable signal is provided to control both the 3.3 and 5.0 DC to DC converters turn on to operating voltage levels in the desired sequence.

Additional problems also arise to insure that during failure of the 3.3 volt supply or converter or during short circuiting of the 3.3 volt supply or converter that the 5 volt supply or converter shuts down before the 3.3 volt supply completely fails. In the event that this does not happen, the aforementioned problems of destruction the 3.3 volt logic will still occur.

SUMMARY OF THE INVENTION

In accordance with the present invention, an apparatus for sequenceing turn-on and turn-off of power converters includes means, responsive to a control signal, for asserting a voltage supply signal and means responsive to the output of said asserting means for sensing the level of voltage at the output of said asserting means and for providing an enable signal in response to the output of said asserting means reaching a desired value. The apparatus further includes means responsive to said enable signal for providing a second supply voltage at a second different voltage level. With such an arrangement, by providing sensing means to sense the output of the first voltage supply and deriving the enable signal for the second power converter from the sensing means, the sequencing of turn-on of a pair of the power converters is provided in response to a single turn-on signal.

In accordance with a further aspect of the present invention, the apparatus further includes means, responsive to said second supply voltage and said means for sensing the level of voltage, for shorting said means for providing a second supply voltage to a reference potential. With such an arrangement, the shorting means is responsive to the voltage of the first converter thus permitting the second converter to be shut down before the first converter shuts down. This arrangement protects low level power supply logic from the presence of a high level input signal in absence of a lower level power supply voltage.

In accordance with a further aspect of the present invention an apparatus for sequencing turn-on and turn-off of power converters includes a first DC to DC converter responsive to a control signal for asserting a voltage supply signal and a sense circuit responsive to the output of said first converter to sense the level of voltage at the output of the first converter and to provide an enable signal in response to the output of said first converter when the first converter reaches a desired value and a second DC to DC converter responsive to said enable signal to provide a second supply voltage at a second different voltage level. The apparatus further includes a circuit responsive to said second supply voltage and the first supply voltage, to short the second DC to DC converter to to a reference potential when the first supply voltage is not at the desired value. With such an arrangement, the sensing circuit senses the output of the first voltage supply and derives the enable signal for the second power converter. Thus, the sequencing of turn-on of a pair of the power converters is provided in response to a single turn-on signal. During turn-off or during accidential shorting or failure of the first supply, the shorting circuit is responsive to the voltage of the first converter forces the second converter to quickly shut down before the first converter shuts down. This arrangement protects low level power supply logic from the presence of a high level input signal in absence of a lower level power supply voltage.

BRIEF DESCRIPTION OF THE DRAWINGS

The above-mentioned and other features of the invention will become more apparent by reference to the following description taken in connection with the accompanying drawings in which.

DESCRIPTION OF THE PREFERRED EMBODIMENTS

Figure 1:
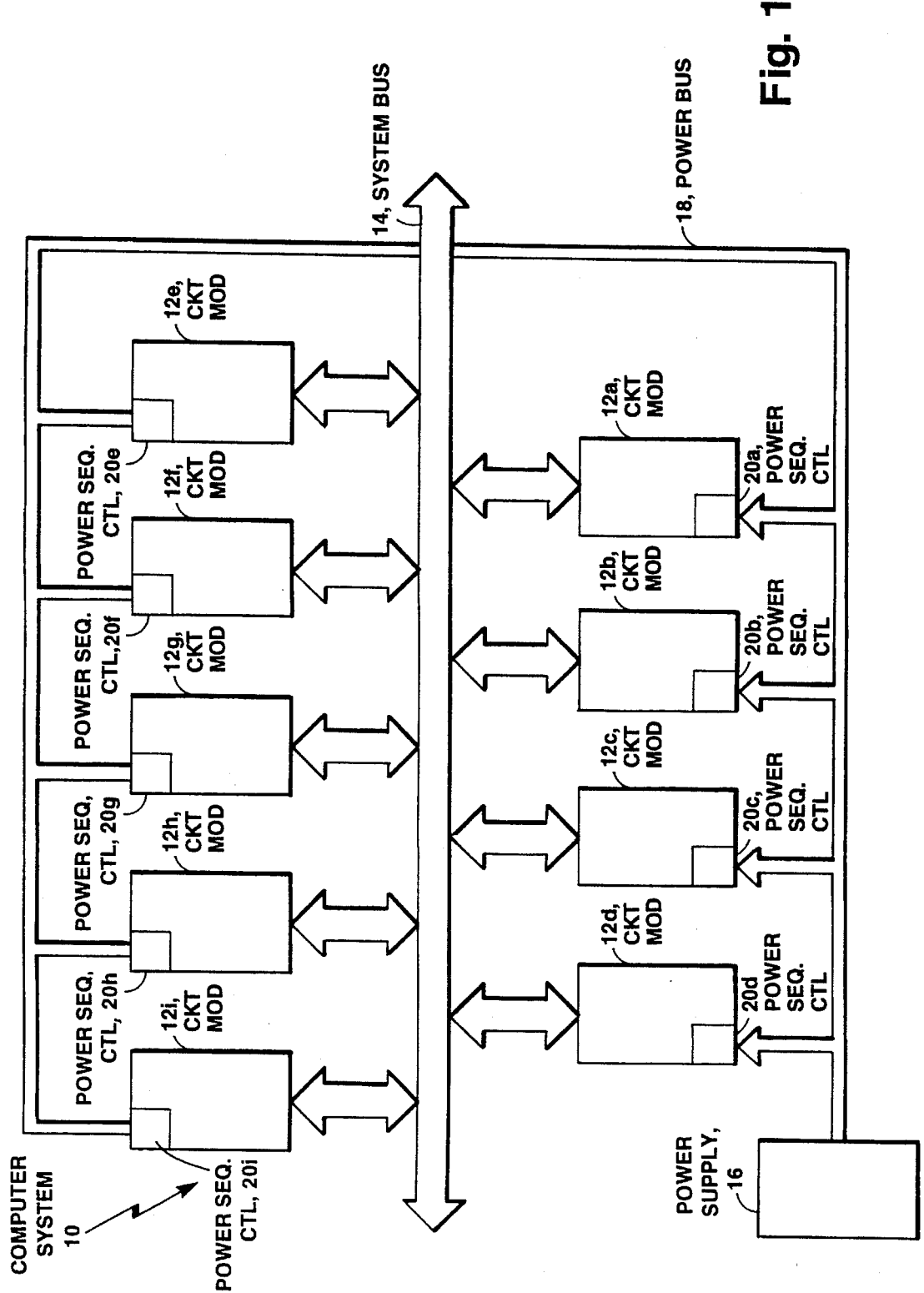
FIG. 1 is a block diagram of a computer system comprised of a plurality of circuit modules.

Referring now to FIG. 1 a computer system 10 is here shown to include a plurality of circuit modules 12a–12i which can illustratively be CPU modules, memory modules or I/O modules as needed. Each of the modules are coupled via a common bus 14. Each of the modules further includes a power sequence control circuit respectively 20a–20i shown disposed on each of the modules 12a to 12i. Each of the power sequence control circuits is fed via a power bus 18 which includes signals provided from a command and control logic element 16 as well as a high DC voltage typically 48 volts provided from a power supply 16. The bus 18 is used to deliver power to each of the modules 12a–12i as well as control signals to each of the modules.

On each of the modules 12a–12i in the respective power sequence control circuit is a 3.3 volt DC to DC converter which fed by the 48 volt supply provides a 3.3 volt supply voltage and a 5.0 volt DC to DC converter which likewise provides a 5.0 volt supply voltage. The power sequence circuit provides signals to control the DC to DC converters to ensure that the converters come up to operating voltages in a known, controlled sequence and in such a manner as to protect logic circuits disposed in each of the modules 12a–12i.

Figure 2:
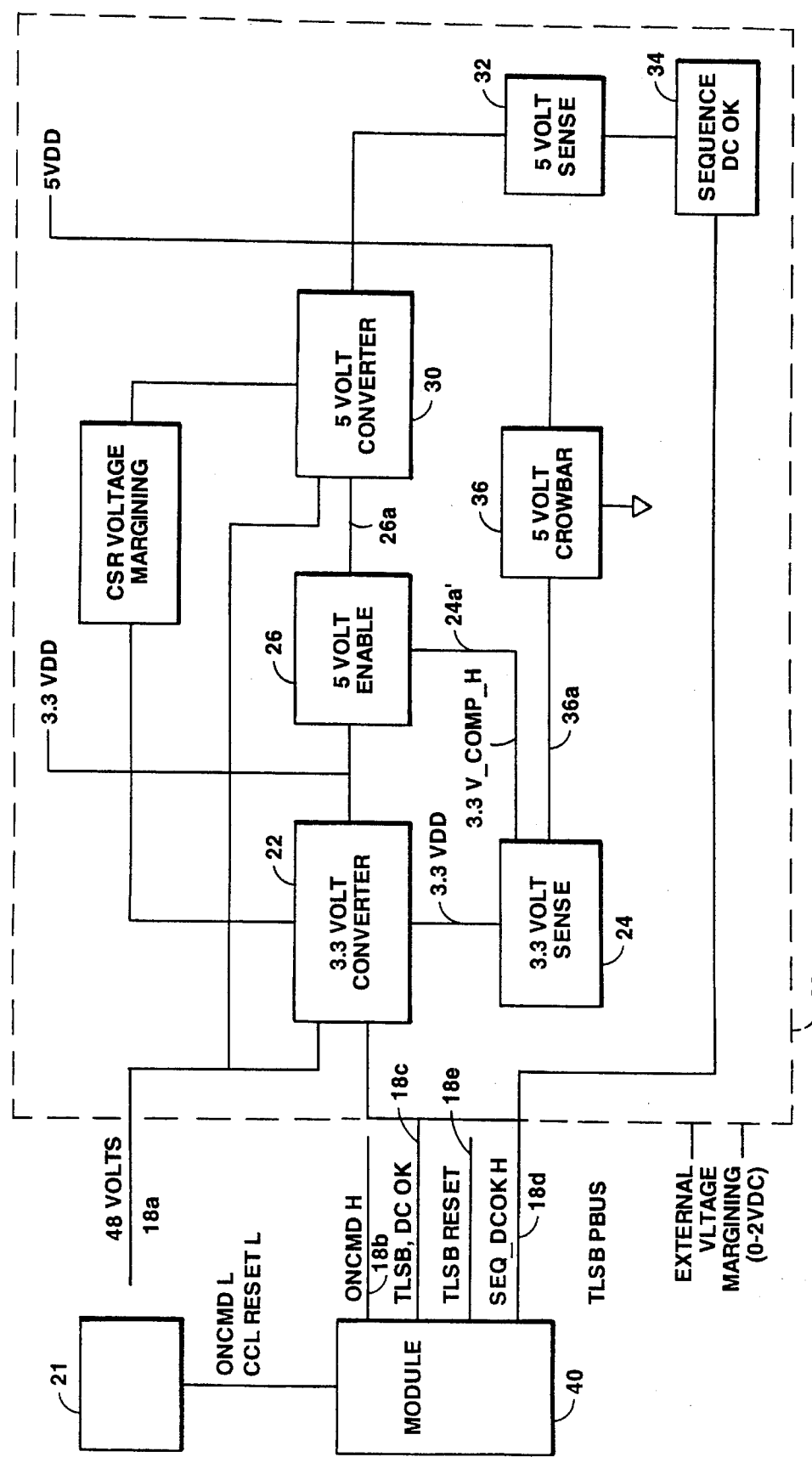
FIG. 2 is a block diagram of a power sequencer used in each of the modules of the system of FIG. 1.

Referring now to FIG. 2, power sequencer 20a which is representative of each of the power sequencers is shown to include a 3.3 volt converter 22 fed via a signal ONCMD_H and a supply line 18a carrying 48 volts. The signal ONCMD_H on line 48b and 48_Volts on line 48a are signals fed via the power bus 18. Power bus 18 here also includes signal DC_OK on line 18c which indicates that all converters on all modules in the system 10 have proper operating voltages and signal SEQ_DC_OK on line 18d which indicates that the converters on a particular module are operating properly. Although only one signal SEQ_DC_OK is shown it should be appreciated that the system will generally have one signal for each module in the system. The power bus 18 further includes a signal on line 18e RESET which is used to reset the sequence in the event of a malfunction.

The 3.3. volt converter 22 is here a standard converter. For some applications the converter used can be a dual or single converter depending on power and heatsinking requirements. The above mentioned converter is a dual 3.3 volt/5.0 volt output converter and thus also provides the 5.0 volt converter 30 shown in FIG. 2.

The 3.3. volt converter 22 is fed via signal ONCMD_H which is the "on" command signal provided via the power bus 18 which origniates in module control logic 21 and responds to illustratively a switch (not shown) being thrown on the computer cabinet console 19. The on command control signal ONCMD_H is used to provide the enable signal for the 3.3 volt converter 22. The 3.3 volt converter 22 is also fed via line 18a the line carrying 48 volt power, the DC high voltage supply fed to each of the modules in FIG. 1.

As the 3.3 volt converter rises to the operating voltage, the output is sensed by a 3.3 volt sense circuit 24. The 3.3 volt sense circuit 24 is used to provide in response a 3.3 COMP_H signal. In response to the 3.3_COMP_H signal a 5.0 volt enable circuit 26 produces a enable signal for the 5 volt converter via line 26a. The 3.3_COMP_H signal provides a control signal for a 5.0 volt crowbar circuit 38, as will be described.

In response to the 3.3 volt compare_H signal and the control signal fed via line 24a to the 5.0 volt enable circuit 26 the 5.0 volt enable signal is asserted on line 26a to the 5.0 converter 30 to enable the 5.0 volt converter to rise to the operating voltage of 5.0 volts.

In this manner the single "on" command circuit signal ONCMD_H is used to control the onset of both 3.3 volt converter and the 5.0 volt converter portions of the dual converter in a controlled sequence. Moreover, the "on" command ONCMD_H signal and the power sequence control signal 20a permits the 3.3 volt converter to provide an operating voltage prior to the 5.0 volt converter thus satisfying requirements in those circuits where 3.3 volts must be present on a 3.3 volt logic circuit prior to application of any 5.0 volt signals to the to 3.3 volt logic circuits.

FIG. 2 further shows a 5.0 volt sense circuit 32 which is used to indicate that 5.0 volts is present at the output of the 5.0 volt converter 30. This 5.0 volt sense circuit 32 provides a signal to Sequence DCOK circuit 34. In response to similar signals from all of the remaining power sequence control circuits 20b to 20i the Sequence DC_0K circuit provides the signal SEQ_DC_OK on line 18d back to the module control logic 40 to indicate that all of the supplies on the modules in the computer system are at the desired voltage. A signal DC_OK (FIG. 6) is then provided to start the processor on the CPU module in the computer system 10.

During failure of the 3.3 volt converter it is necessary that the 3.3 volts be maintained until the 5.0 volt converter can be shut down and brought to a voltage of below the voltage of the 3.3 volt converter. This is accomplished by the 3.3 volt sense circuit 24 sensing the voltage on 3.3. VDD and asserting a signal on line 36a to the 5.0 volt crowbar circuit 36. In the event that the 3.3 volts supply is failing, the signal on line 36a initiates or enables the 5.0 volt crowbar circuit to quickly dump all current from the 5.0 volt converter into a ground node, thus permitting the 5.0 volt converter to be turned off before the 3.3 volt converter completely fails. This arrangement is also used to turn off the 5 volt converter prior to turning off the 3.3 volt converter by deassertion of the on command signal ON_CMD_L which as the enable for the 3.3 volt converter disables the converter when the signal is not asserted thereby causing 3.3 volt converter to drop and the 3.3 volt sense circuit 24 asserting signal on line 36a to the 5 volt crowbar circuit 36 to immediately crowbar the 5 volt supply to ground.

Figure 3:
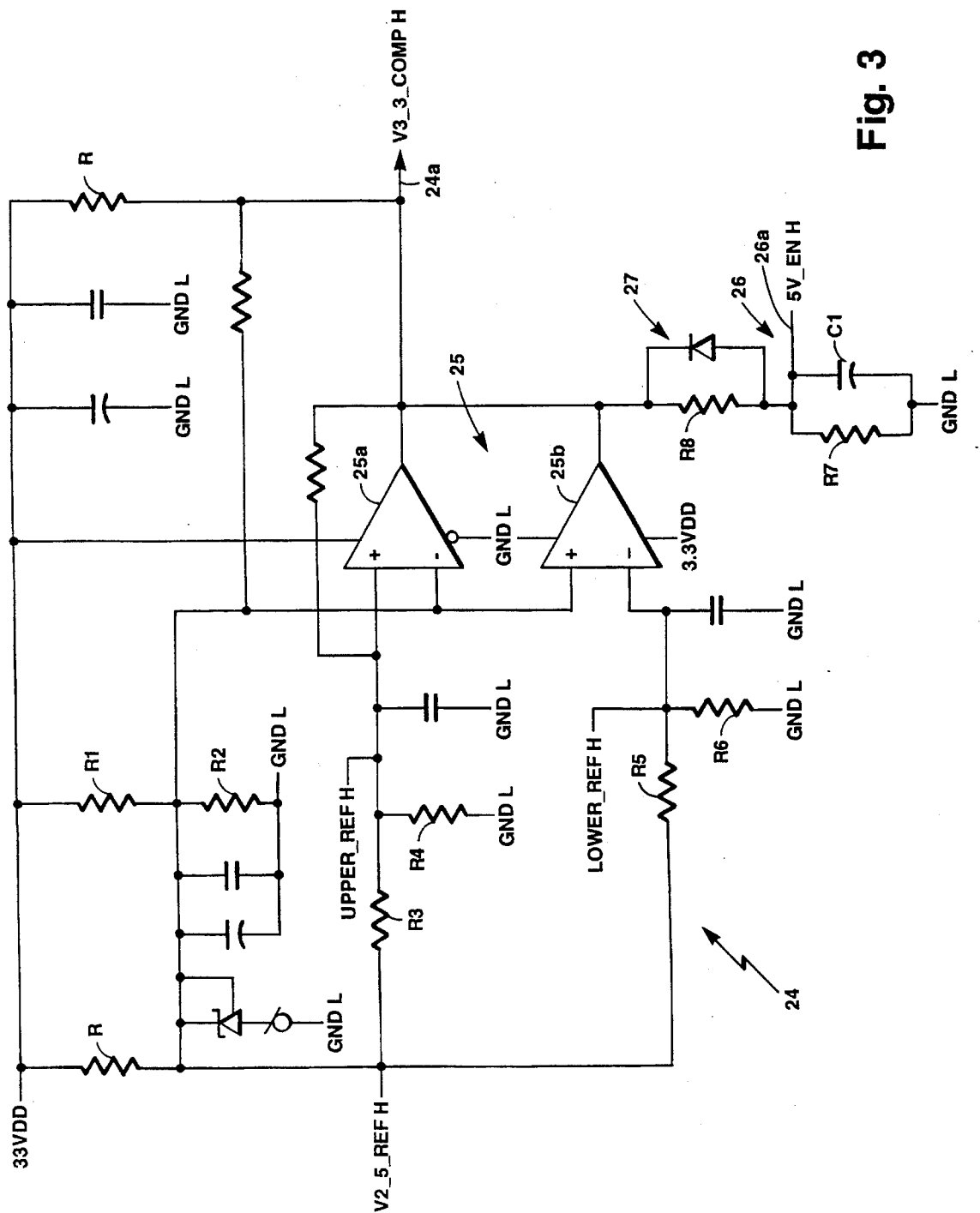
FIG. 3 is a schematic diagram of a voltage sense and enable circuit for use in the power sequencer of FIG. 2.

Referring now to FIG. 3, the 3 volt sense and 5 volt enable circuits 24 and 26 are shown. The 3 volt sense circuit 24 is shown to include a pair of comparators 25a, 25b coupled to provide a window comparator. The comparators are here coupled in a common package and each are fed via the 3.3_VDD supply line from the converter 22 and are coupled to a reference potential here ground. Each comparator has a pair of inputs, with the positive input of comparator 25b and the negative input of comparator 25a being coupled to the center tap of a voltage divider provider via resistor R1 and R2 as shown. Resistors R1 and R2 typically provide a 0.33 voltage divider ratio. Thus, resistor R1 is typically twice the resistance of resistor R2. Other voltage divider ratios could alternatively be used. The voltage on the line 3.3_VDD thus provides a lower, selected voltage across the resistor R2 which provides a reference voltage for each of comparators 25a and 25b.

Comparator 25a also has a non-inverting terminal fed via line V2.5_REF which is coupled via a small resistance to the 3.3 VDD supply line as shown. Likewise, the inverting terminal of comparator 25b is coupled to 2.5_REF. The outputs of comparators 24a and 24b are coupled together to provide signal V3.3_COMP. By providing this arrangement of comparator 25a and 25b the comparators can assert a signal V3.3_COMP to indicate that the 3.3 volts supply is within a widow of + or −5% or other percentage depending upon the values used to provide the resistors R3 and R4 and R6 and R7 for each of the inputs of the 2.5_REF. When the voltage at the non inverting terminal of comparator 25a becomes higher than 2.5_REF by 5% or the voltage on the inverting terminal of comparator 25b becomes lower than the voltage on 2.5_REF by 5% signal V3.3_COMP_H will be deasserted thereby indicating that the 3 volt sense circuit is sensing that the 3.3 volts converter is not operating at 3.3 volts ±5% of its desired tolerance. The exact values used for R3, R4, R5, R6 would thus be dependent upon the desired tolerance required by the particular design and furthermore it should be noted that v2.5_REF will track the 3.3 VDD voltage via the connection with the low value resistance R as shown. Upon assertion of 3.3_COMP the 3.3 volt DC to DC converter has reached its operating voltage and thus 3.3 VDD is at 3.3 volts. Thus, this circuit operates using the 3.3 volt converter output to sense that the 3.3 volt converter is at operating voltage as the converter reaches the proper voltage.

Thus V3.3_comp is fed to 5 volt enable circuit 26 here a parallel RC combination of resistor R7 and capacitor C1 and circuit 27 which has a resistor R8 in parrallel with a diode D1. Resistor R8 and capacitor C1 provide a RC time constant characteristic to the voltage signal on line 5 V_EN_H which is derived from the 3.3_COMP signal to provide a turn-on delay of the 5 volt supply. The diode D is used to bypass R9 when turning off the 5 Volt converter.

Figure 3A:
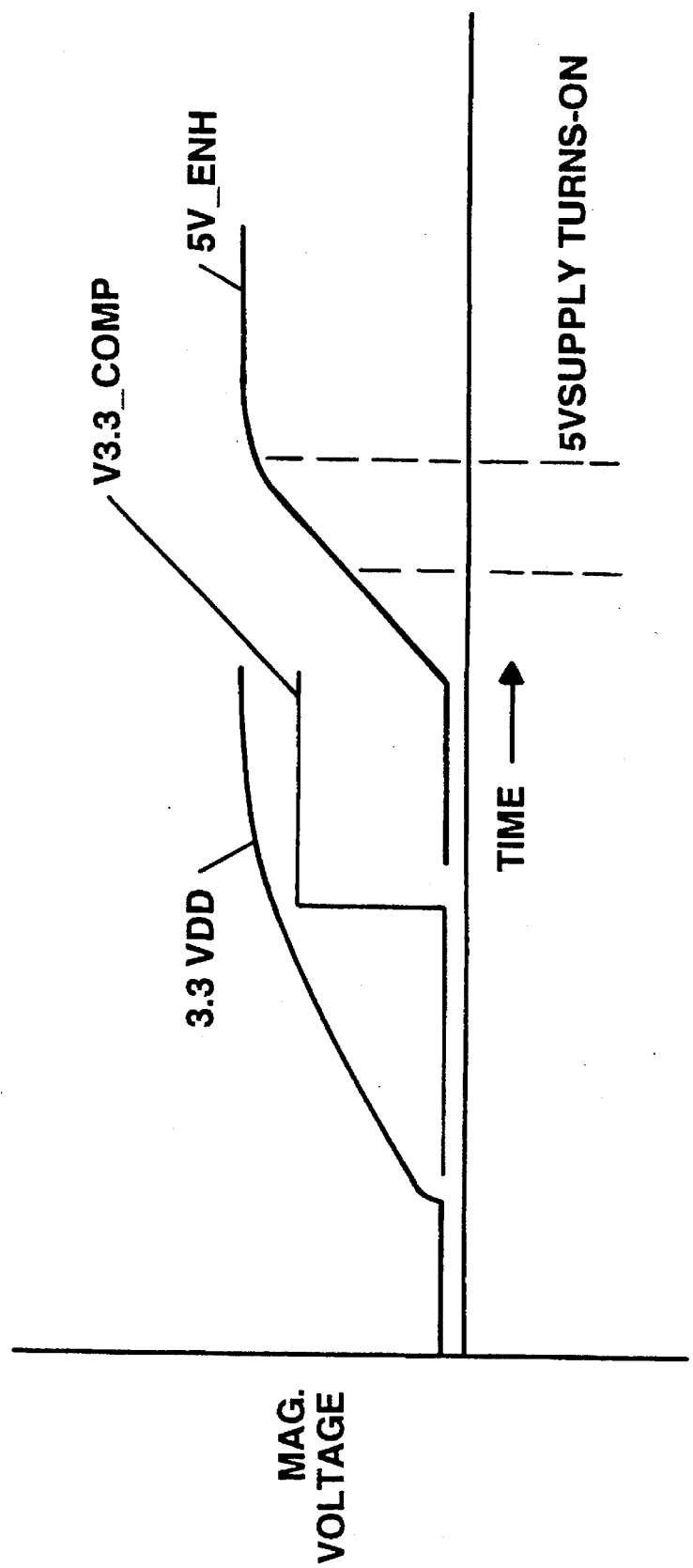
FIG. 3A is a plot showning a general timing relationship between signals provided by the circuit of FIG.3.

Assertion of the 3.3_COMP signal from the comparator circuits 25a, 25b thus permits the signal 5 V_EN5 volt enable signal to rise with a rise time in accordance with the values of R8 and C1. The 3.3 volt sense and 5 volt enable as well as 3.3_VDD signals thus have a relationship as shown in FIG. 3A, where r1–r3 are the rise times for respectively 3.3 VDD, V3.3_COMP and 5 V_EN and d1 and d2 are the noted delays occasioned by triggering of the window comparator and turn-on of the 5 volt converter 30 (FIG. 2). The 3.3 volt sense and 5 volt enable circuits also include filtering capacitors not otherwise referenced.

Upon assertion of 5 V_EN the signal via line 26a is fed to the 5 volt converter 30 and permits the 5 volt converter 30 to turn on in a known manner. The output of the converter 30 (FIG. 2) is coupled to 5 VDD to provide the 5 volt supply for the circuit and is also coupled to the 5 volt sense circuit 32 as shown.

Figure 4:
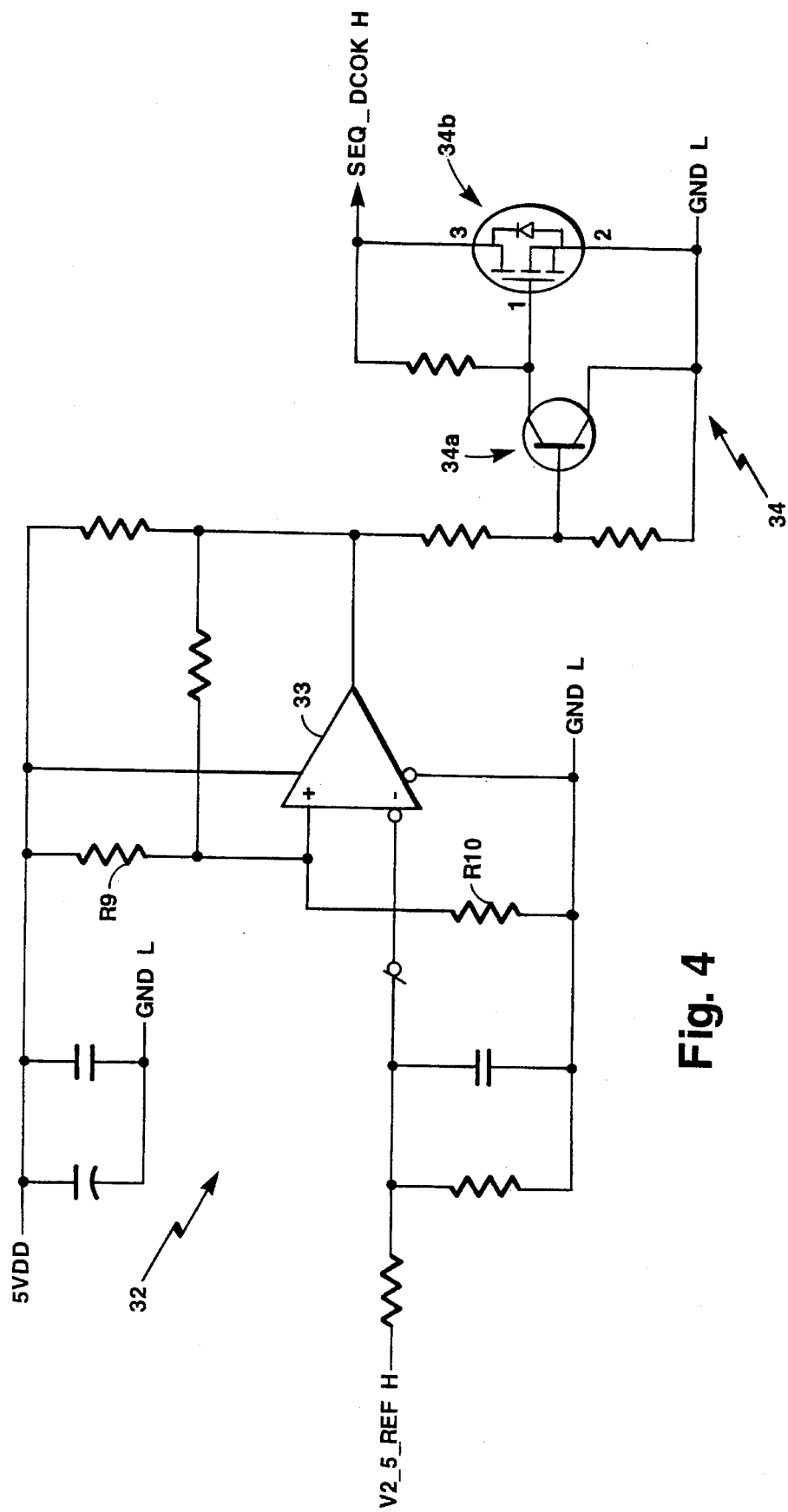
FIG. 4 is a schematic diagram of a voltage sense and circuit for use in the power sequencer of FIG. 2.

Referring now to FIG. 4, the 5 volt sense circuit 32 is shown to include a comparator 33 having an inverting input coupled via 2.5_REF (FIG. 3) and a noninverting input coupled via a resistor R9 to 5_VDD the 5 volt supply and a resistor R10 to ground. The 5 volt sense circuit 32 provides from the comparator 33 an output signal which indicates that the signal on 5_VDD is at the operating voltage of 5 volts. By selection of the values of the resistor R9 and R10 an appropiate reference is provided at the comparator.

The Sequence DC_OK circuit 34 is shown to include transistors 34a and 34b arranged to provide a signal SEQ_DCOK at appropiate logic levels which indicates that the DC power converters at their proper operating voltages. These transistors are used to provide SEQ_DCOK as logic level signal of 5.0 volts indicating that the condition is true and less than 3 volts indicating the condition is not true. This signal is used by logic devices in the remainder of the power system.

Figure 5A:
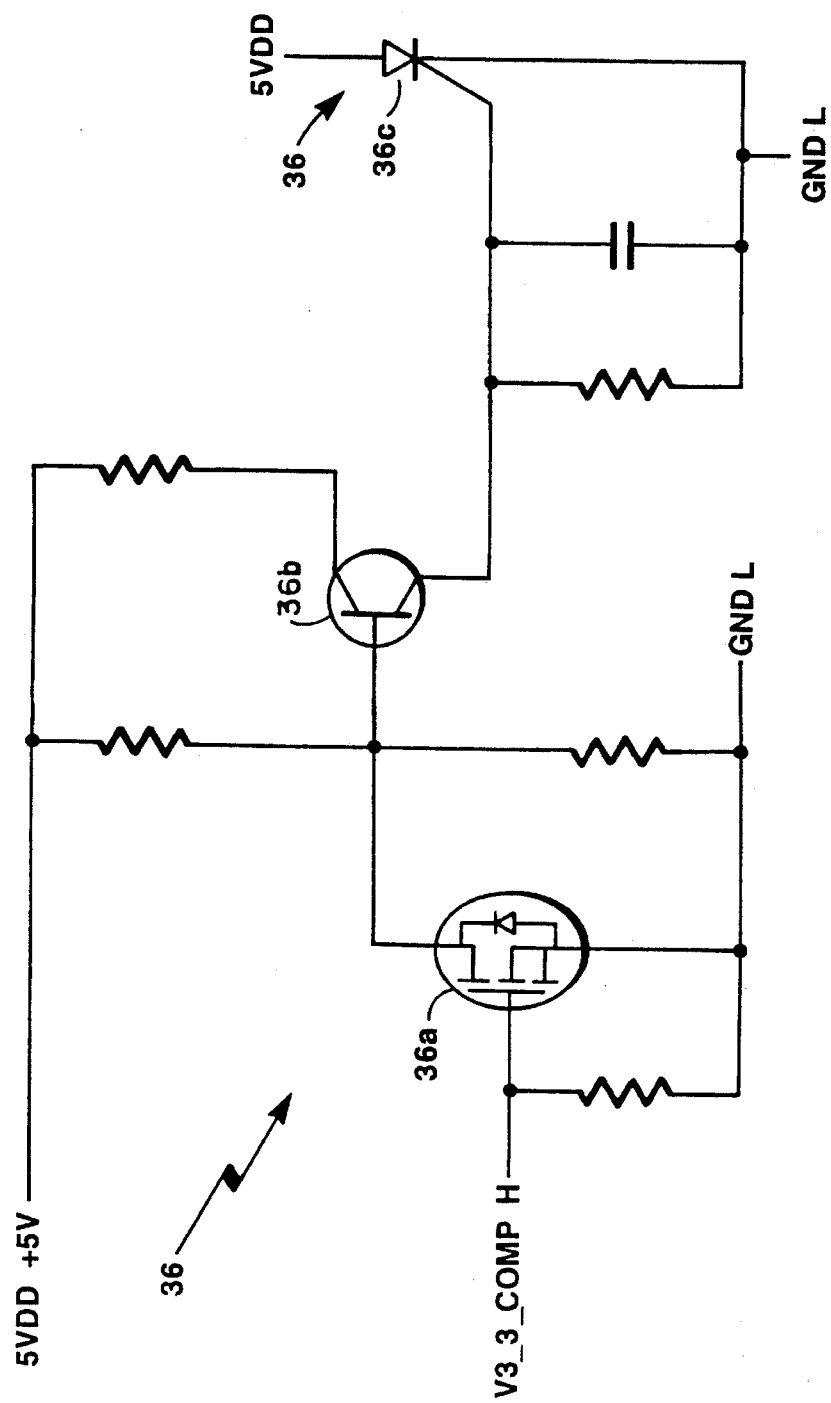
FIG. 5A is a schematic diagram of discharge circuit used in the power sequencer of FIG. 2.

Referring now to FIG. 5A, the 5 volt discharging crowbar circuit 36 is shown fed via signal V3.3_COMP, and includes a pair of transistors 36a and 36b which provide a control signal to the control terminal of a silicon controlled rectifier 36c. When 3.3 volts COMP is high is keeps field effect transistor (FET) 36a on and the bipolar transistor 36b off thus keeping the signal on line 31 low and the SCR (silicon controlled rectifier) off. When 3.3 COMP goes low as for example when turning off the 3.3 volt supply and hence requiring the 5.0 volt supply to be turned off, or during failure of a 3.3 converter, the FET 36a turns off thus enabling the bipolar transistor 36b to turn on causing the signal on line 31 to go high and likewise causing the SCR 36c to trigger and provide a short circuit between 5_VDD and ground and discharging all of the current from the 5 volt supply and the capacitors into the ground node.

This protects the 3.3 logic devices from the presence of 5 volts at their inputs without the 3.3 volt supply functioning. Due to the capacitance provided throughout the module and the computer system during one of the aforementioned events 3.3 volts will remain on the supply line as the 3.3 Volt converter is failing after the 5_VDD line has been discharged by the 5 volt discharge and crowbar circuit 36. The 5 volt discharge circuit 30 also is a self-biased circuit since it is coupled to the 5_VDD supply line. Thus in the event the 5 volt converter turns on before the 3.3 volt converter turns on due to some error condition in the power sequencer the bipolar transistor 36b would be self-biased to trigger the SCR 36c to discharge the 5 volt converter into ground and thus also protecting 3.3 volt logic as explained above.

Figure 5B:
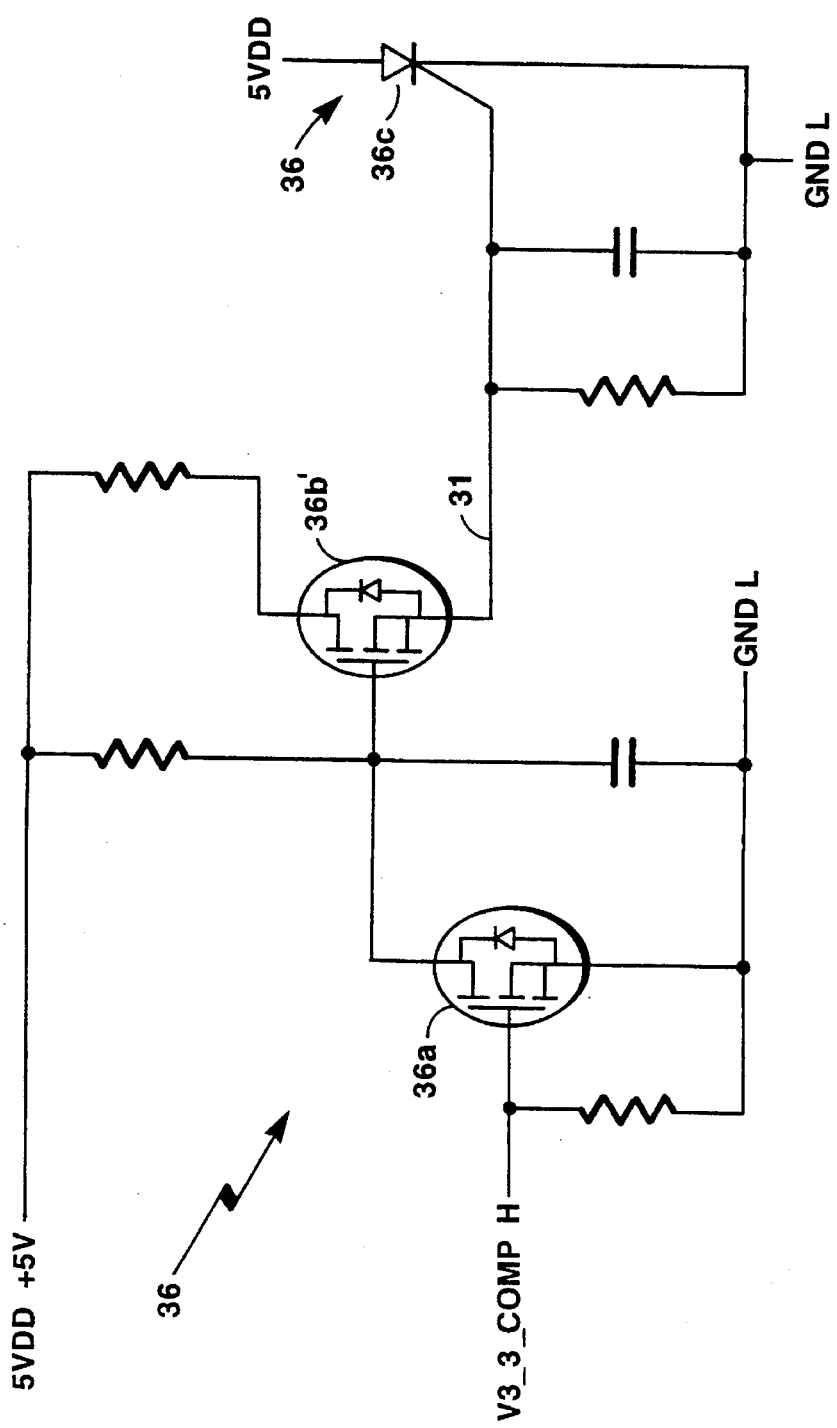
FIG. 5B is a schematic diagram of an alternate embodiment of a discharge circuit used in the power sequencer of FIG. 2.

Referring now to FIG. 5B, an alternate embodiment of the 5 volt discharging crowbar circuit 36' is shown fed via signal V3.3_COMP, and includes a pair of transistors 36a' and 36b' which provide a control signal to the control terminal of a silicon controlled rectifier 36c. When 3.3 volts COMP is high is keeps field effect transistor (FET) 36a on and a FET 36b' off thus keeping the signal on line 31 low and the SCR (silicon controlled rectifier) off. When 3.3 COMP goes low as for example when turning off the 3.3 volt supply and hence requiring the 5.0 volt supply to be turned off, or during failure of a 3.3 converter, the FET 36a turns off thus enabling the FET 36b' to turn on. However, the capacitance provided by capacitor C2 provides in combination with the resistance of R11 a time constant to delay firing of the SCR 36c. This delayed firing permits the SCR 36c to trigger and provide a short circuit between 5_VDD and ground and discharging all of the current from capacitors (not shown) into the ground node but gives the 5 volt converter 30 sufficient time to turn-off so that the SCR 36c does not have to sink all of the current from the 5 volt converter during shut down of the 5 volt converter. This arrangement is preferrable for those applications where the converter provides relatively high currents and the SCR is somewhat limited in current sinking capacity.

This arrangement also protects the 3.3 logic devices from the presence of 5 volts at their inputs without the 3.3 volt supply functioning connections to the logic, due to the capacitance provided throughout the module for the 3.3 volt logic as explained above.

Figure 6:
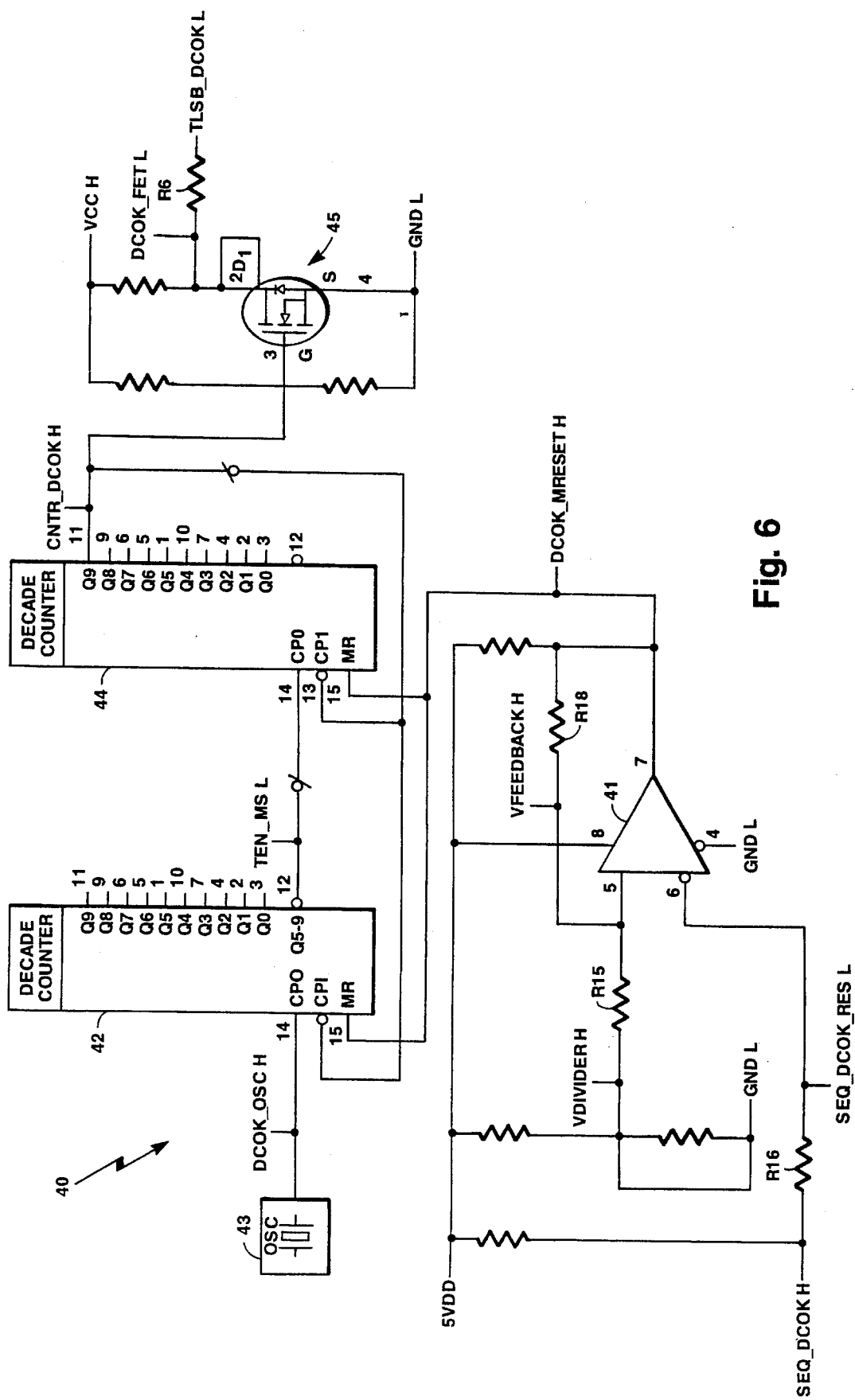
FIG. 6 is a schematic diagram of a circuit used to indicate that each of the modules has proper voltages applied and provide a reset for the power sequencer of FIG. 2.

Referring now to FIG. 6, a SYSTEM_DCOK and Master reset circuit 40 is shown to include a comparator 41 fed via signal SEQ_DCOK which is the DCOK sequence signal provided from each of modules 12a–12i and which is illustratively shown for one signal in FIG. 4 of module 12a. That is, a circuit 40 is provided in each system using the power sequence circuit described and the signals SEQ_DCOK for each module in the system or for each power sequencer in the system typically provided in each module system are tied together and when all of signals SEQ_DCOK for each of the modules 12a–12i are at the proper high voltage the comparator 41 will cause DC_OK_MRESET to go to a low logic level enabling a counter 42 fed via a low frequency oscillator 43 as shown. DC_OK_MRESET can be used elsewhere in the system. Likewise, the output of the counter 43 is fed to a second counter 44, and the output to the second counter is fed to a FET 46 to provide a signal "System DCOK". The pair of decade counters 42 and 44 provide a 100 millisecond delay prior to asserting system DCOK to ensure that each of the power converters on each of the modules is at the appropriate supply voltage.

Having described preferred embodiments of the invention, it will now become apparent to those of skill in the art that other embodiments incorporating its concepts may be provided. It is felt, therefore, that this invention should not be limited to the disclosed embodiments but rather should be limited only by the spirit and scope of the appended claims.

What is claimed is:

1. An apparatus comprising:

means, responsive to a control signal, for asserting a voltage supply signal;

means responsive to the output of said asserting means for sensing the level of voltage at the output of said asserting means and for providing an enable signal in response to the output of said asserting means reaching a desired value; and means responsive to said enable signal for providing a second supply voltage at a second different voltage level.

2. The apparatus of claim 1 further comprising:

means, responsive to said second supply voltage and said means for sensing the level of voltage, for shorting said means for providing a second supply voltage to a reference potential.

3. The apparatus of claim 2 further comprising:

means for sensing that the second supply voltage is at a desired operating voltage level.

4. The apparatus of claim 3 further comprising;

means, responsive to the means for sensing the second voltage, for providing a signal indicating that the first voltage and the second voltage are at desired operating values.

5. An apparatus for sequencing turn-on and turn-off of power converters comprises;

a first DC to DC converter responsive to a control signal for asserting a voltage supply signal;

a sense circuit responsive to the output of said first converter to sense the level of voltage at the output of the first converter and to provide an enable signal in response to the output of said first converter when the first converter reaches a desired value;

a second DC to DC converter responsive to said enable signal to provide a second supply voltage at a second different voltage level; and a circuit responsive to said second supply voltage and the first supply voltage, to short the second DC to DC converter to to a reference potential when the first supply voltage is not at the desired value.

\* \* \* \* \*